No. 876,359.  
PATENTED JAN. 14, 1908.  
L. KARGER.  
PRESSURE REGULATOR FOR COMPRESSED GAS PLANTS.  
APPLICATION FILED MAY 11, 1906.
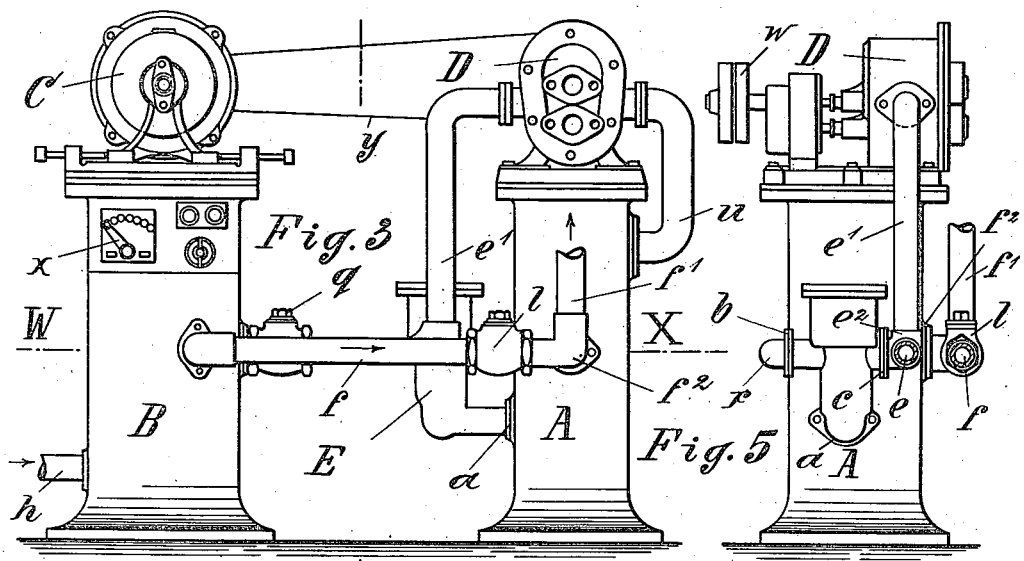
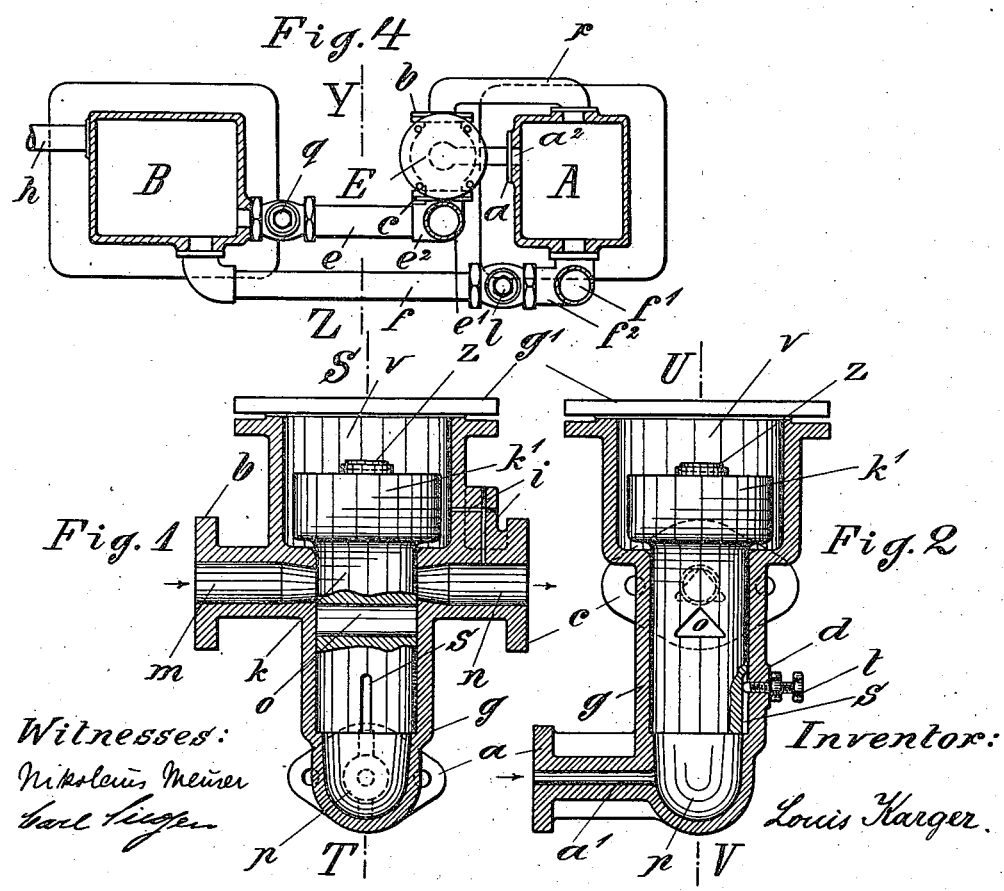
Witnesses:  
Inventor: Louis Karger.

UNITED STATES PATENT OFFICE.

LOUIS KARGER, OF EHRENFELD, GERMANY.

PRESSURE-REGULATOR FOR COMPRESSED-GAS PLANTS.

No. 876,359.　　　Specification of Letters Patent.　　　Patented Jan. 14, 1908.

Application filed May 11, 1906. Serial No. 316,340.

*To all whom it may concern:*

Be it known that I, LOUIS KARGER, a citizen of the Empire of Germany, residing at Ehrenfeld, Cologne-on-the-Rhine, in the Empire of Germany, have invented a new and useful Pressure - Regulator for Compressed-Gas Plants, of which the following is a specification.

My invention relates to compressed gas plants, in which gas supplied from the gas main in the street is compressed and conducted to the respective lamps, since the pressure of the gas in the said main is too low for the said lamps.

The compressed gas plants are of that kind, in which a suction reservoir is connected with the gas main and serves for storing up the gas under ordinary pressure, while a compressor is employed for sucking the gas from the said suction reservoir and for forcing it under a greater pressure into a delivery reservoir, from whence the compressed gas is conducted through a pipe system to the several lamps, it being optional to insert somewhere an apparatus for mixing the compressed gas with air. As the number of the lamps in use may vary, in other words the consumption of the gas may vary, and as it is essential that the pressure of the compressed gas should remain practically invariable, pressure regulators are usually employed.

My invention consists of improvements in pressure regulators of that kind, in which a piston is employed and placed under the control of the compressed gas for regulating the supply of gas from the suction reservoir to the compressor by returning the excess of the compressed gas to the suction pipe, in case the pressure of the compressed gas exceeds a certain limit.

The objects of my improvement are, first, to adapt the piston to act by its own weight exclusively without the aid of any intermediary parts such as levers, springs, weights and the like; second, to so dispose the piston, that it is acted upon from below by the excess of the pressure; third, to provide the piston with a cross passage of a preferably triangular cross section, which passage in the uppermost position of the piston can register with two corresponding passages in the casing; fourth, to provide the piston with a longitudinal groove, in which the point of a screw in the casing engages, so as to prevent the piston from turning; fifth, to put the space above the piston in the casing in communication with the suction passage through a narrow channel, so as to prevent the formation of an overpressure or a vacuum in the said space; and, sixth, to provide a buffer on the top of the piston for striking against a cover and thus determining the uppermost position of the piston, while softening any blow.

I will now proceed to describe my invention with reference to the accompanying drawings, in which—

Figure 1 is a vertical longitudinal section through a pressure regulator on the line U—V in Fig. 2 seen from right to left, Fig. 2 is a vertical cross section through the same on the line S—T in Fig. 1, seen from left to right, Fig. 3 shows for example a gas compressing plant on a reduced scale, in which the above mentioned pressure regulator is employed, Fig. 4 is a horizontal section through the same on the line W—X in Fig. 3, and Fig. 5 is a vertical cross section through the line Y—Z in Fig. 4, seen from left to right.

Similar letters of reference refer to similar parts throughout the several views.

The gas compressing plant shown comprises a suction reservoir B, a gas compressor D, a delivery reservoir A and a pressure regulator E. The suction reservoir B is connected with a gas main or a gas counter by means of a pipe $h$ and with the compressor D by means of a suction pipe $e\ e^1$. The compressor D is connected with the delivery reservoir A by means of a bent pipe $u$. The delivery reservoir A is connected with the delivery pipe $f^1$, which conducts the compressed gas to the respective lamps. The delivery pipe $f^1$ is shown as at the same time connected with the suction reservoir B by means of a pipe $f$ and a connection $f^2$. A check valve $l$ is inserted between the pipe $f$ and the connection $f^2$ for a purpose to be explained later on. A check valve $q$ is also inserted between the suction reservoir B and the suction pipe $e$. The gas compressor D may be of any known construction. It is shown as arranged to be driven from an electromotor C by means of a driving belt $y$ and a fast pulley $w$. The construction of the electromotor C is immaterial and a switch $x$ is shown at Fig. 3 for starting it.

The pressure regulator E is fully shown at Figs. 1 and 2. It consists of a casing $g$, a cover $g^1$ and a piston $k$. The casing $g$ has a cylindrical part, in which the piston $k$ is vertically guided. The space $p$ beneath the piston $k$ is put in communication with the delivery reservoir A through a narrow channel $a^1$ and an opening $a^2$ (Fig. 4). The casing $g$ is fastened on the reservoir A by means of a flange $a$ and screws. The piston $k$ is shown as provided with a head $k^1$ of a larger diameter, which plays within a space $v$ in the casing $g$. On the top of this head $k^1$ a buffer $z$ of india rubber, leather or other elastic material is secured, which is arranged for striking against the cover $g^1$ and serves for diminishing any blow. The piston $k$ normally rests on a shoulder of the casing $g$ and its stroke is limited by the cover $g^1$. The casing $g$ has two tubular connections $m$ and $n$ in the same horizontal axis at right angles to the piston $k$ and the latter is provided with a cross channel $o$, which can register with the two connections $m$ and $n$ in the uppermost position of the piston $k$. Preferably the cross channel $o$ is made triangular in section, as is shown at Fig. 2. In accordance with this the ends of the two connections $m$ and $n$ are made to lead from a circular area up to a triangular area at the piston $k$. The upper space $v$ in the casing $g$ is put in communication with the one connection $n$ through a narrow channel $i$. In order to prevent the piston $k$ from turning, it is provided with a longitudinal slot $s$, in which the point $d$ of a screw $t$ engages. Thereby the cross channel $o$ is maintained in the vertical plane of the two connections $m$ and $n$, so that it may register with the latter with safety. The flange $b$ of the connection $m$ is connected with the corresponding flange of a bent pipe $r$, the other flange of which is fastened on the delivery reservoir A (see Fig. 4). The flange $c$ of the connection $n$ is connected with that of a connection $e^2$ between the two suction pipes $e$ and $e^1$.

This gas compressing plant in combination with the pressure regulator operates as follows: The suction reservoir B is filled with gas under ordinary pressure from the gas-counter. Normally this gas under ordinary pressure is conducted through the pipe $f$, the check valve $l$, the connection $f^2$ and the delivery pipe $f^1$ to the pilot-lights of the lamps. In this case of course also the delivery reservoir A, the delivery pipe $u$, the pipe $r$, the channel $a^1$ and the space $p$ in the regulator E will be filled with gas under ordinary pressure. The weight of the piston $k$ is so adjusted, that it requires an excess of the pressure (equal to that in the delivery reservoir A) of the gas beyond the maximum determined for lifting the piston $k$. On starting the electromotor C by means of the switch $x$ the compressor D will commence to suck gas under ordinary pressure from the suction reservoir B through the check valve $q$, the suction pipe $e$, the connection $e^2$ and the suction pipe $e^1$ and to force the gas under a greater pressure through the pipe $u$ into the delivery reservoir A. The increased pressure of the gas in the delivery pipe $f^1$ will close the check valve $l$, so that the latter prevents the compressed gas from returning to the suction reservoir B. Of course the increased pressure of the gas in the space $p$ of the casing $g$ will act upon the piston $k$ but without producing any visible effect, as long as this pressure is beneath or equal to the maximum pressure. The lamps may be all or partly turned on, when a greater or smaller quantity of the compressed gas will be consumed. In case not all the lamps are burning, the pressure of the compressed gas will exceed the maximum determined, so that this excess of the pressure will lift the piston $k$. The latter may move upwards until it strikes against the cover $g^1$, when a full communication will be established between the two connections $m$ and $n$ through the cross passage $o$, so that compressed gas passes from the delivery reservoir A to the suction pipe $e^1$, where it mixes with the gas under ordinary pressure, so that the total pressure will be reduced. The gas returned passes once more through the compressor. As long as the consumption of the gas is not large, a part of the compressed gas may repeatedly pass through the compressor, while the latter will suck only a reduced quantity of gas under ordinary pressure from the suction reservoir B. In proportion to the pressure of the compressed gas within the reservoir A decreasing and increasing the piston $k$ will sink and reduce the area of the cross channel $o$ or it may go upwards and increase the said area, whereby the pressure of the compressed gas is regulated. The gas within the space $v$ may serve as a cushion for retarding the upward motion of the piston $k$ and the narrow channel $i$ serves for balancing the piston $k$, as it prevents the formation of both an overpressure during the upward motion and of a vacuum during the downward motion of the piston. The triangular shape of the cross section of the passage $o$ and the adjoining sections of the two passages $m$ and $n$ is useful for a gradual increase and decrease of the quantity of compressed gas passing over, so that any shock is reduced or avoided. The pressure of the more or less compressed gas in the suction pipes $e$ and $e^1$ will of course more or less close the check valve $q$, which latter therefore prevents an overpressure of the gas from passing over to the gas main in the street, where it otherwise might create disturbances. As the space $p$ in the casing $g$ is large and the area of the narrow channel $a^1$ is in proportion small, the piston $k$ will be prevented from too violently moving up and down.

The pressure regulator described may be varied without departing from the spirit of my invention.

I claim:

1. In a pressure regulator for compressed gas plants, the combination with a gas-compressor, of a casing comprising a vertical cylindrical part, a chamber below with a shoulder, a wider chamber above and two opposite horizontal passages, which each lead from a circular area up to a triangular opening in the cylindrical part, a connection between the one horizontal passage in said casing and the suction of said gas-compressor, a connection between the other horizontal passage of said casing and the delivery of said gas-compressor, a narrow connection between the lower chamber of said casing and the delivery of said gas-compressor, a cover on said casing, a piston guided in the cylindrical part of said casing and normally resting on the shoulder and adapted to be raised by an excess of the pressure of the compressed gas beyond the maximum determined, so that the piston may strike said cover, said piston being provided with a cross passage of a triangular cross section which in the uppermost position of the piston can register with the two triangular openings in said casing, and means for preventing said piston from turning.

2. In a pressure regulator for compressed gas plants, the combination with a gas-compressor, of a casing comprising a vertical cylindrical part, a chamber below with a shoulder, a wider chamber above and two opposite horizontal passages adjoining the cylindrical part, a connection between the one horizontal passage in said casing and the suction of said gas-compressor, a connection between the other horizontal passage of said casing and the delivery of said gas-compressor, a narrow connection between the lower chamber of said casing and the delivery of said gas-compressor, a cover on said casing, a piston guided in the cylindrical part of said casing and normally resting on the shoulder and adapted to be raised by an excess of the pressure of the compressed gas beyond the maximum determined, said piston being provided with a cross passage which in the uppermost position of the piston can register with the two opposite horizontal passages in said casing, means for preventing said piston from turning, and a buffer on the top of said piston and adapted to strike said cover, a narrow channel being provided in said casing to connect the upper wider chamber with the suction horizontal passage for preventing the formation of an overpressure or a vacuum.

3. In a pressure regulator for compressed gas plants, the combination with a gas-compressor, of a casing comprising a vertical cylindrical part, a chamber below with a shoulder, a wider chamber above and two opposite horizontal passages, which each lead from a circular area up to a triangular opening in the cylindrical part, a connection between the one horizontal passage in said casing and the suction of said gas-compressor, a connection between the other horizontal passage of said casing and the delivery of said gas-compressor, a narrow connection between the lower chamber of said casing and the delivery of said gas-compressor, a cover on said casing, a piston guided in the cylindrical part of said casing and normally resting on the shoulder and adapted to be raised by an excess of the pressure of the compressed gas beyond the maximum determined, said piston being provided with a cross passage of a triangular cross section which in the uppermost position of the piston can register with the two triangular openings in said casing, a longitudinal groove being provided in said piston, a pin in said casing and adapted to engage in the longitudinal groove of said piston, and a buffer on the top of said piston and adapted to strike said cover and to determine the uppermost position of said piston, a narrow channel being provided in said casing to connect the upper wider chamber with the suction horizontal passage for preventing the formation of an overpressure or a vacuum.

LOUIS KARGER.

Witnesses:
LOUIS VANDORN,
URSUE PEETZ.